United States Patent [19]
Ungruh

[11] Patent Number: 5,797,253
[45] Date of Patent: Aug. 25, 1998

[54] HAY MAKING MACHINE

[75] Inventor: Josef Ungruh, Rheine, Germany

[73] Assignee: H. Niemeyer Soehne GmbH & Co. KG, Hoerstel, Germany

[21] Appl. No.: 692,804

[22] Filed: Jul. 30, 1996

[30] Foreign Application Priority Data

Aug. 1, 1995 [DE] Germany .............. 295 12 347 U

[51] Int. Cl.$^6$ .......................... A01D 78/12; A01D 79/06
[52] U.S. Cl. .................................. 56/370; 56/367
[58] Field of Search ..................... 56/365, 366, 367, 56/370, 377; 172/59, 110, 111, 522

[56] References Cited

U.S. PATENT DOCUMENTS

| | | | |
|---|---|---|---|
| 4,020,620 | 5/1977 | van der Lely | 56/370 |
| 4,062,174 | 12/1977 | Knuesting | 56/370 |
| 4,275,552 | 6/1981 | DeCoene | 56/370 |
| 4,281,506 | 8/1981 | Wattron | 56/370 |
| 4,352,268 | 10/1982 | van der Lely et al. | 56/370 |

FOREIGN PATENT DOCUMENTS

| | | |
|---|---|---|
| 3107162 | 9/1982 | Germany . |
| 3123020 | 1/1983 | Germany . |
| 3433172 | 3/1986 | Germany . |

*Primary Examiner*—Terry Lee Melius
*Assistant Examiner*—Robert Pezzuto
*Attorney, Agent, or Firm*—Jordan and Hamburg

[57] ABSTRACT

A hay making machine includes a rake which is supported on the ground and which includes a prong carrier having a longitudinal axis. A double prong spring element is carried on the prong carrier, the double prong spring element including first and second leg springs and a connecting section connecting the first and second leg springs. The connecting section includes two helical coils coiled in opposite directions and a U-shaped loop between the two helical coils. The helical coils have an axis aligned with the longitudinal axis of the prong carrier. The double prong spring element has a crank-shaped section providing an offsetting relationship between the first and second leg springs.

33 Claims, 8 Drawing Sheets

HAY MAKING MACHINE

BACKGROUND OF THE INVENTION

The invention relates to a hay making machine and particularly to a gyro windrow harvester.

German 31 23 020 A1 discloses a hay making machine for tedding or windrowing, for which in each case a double spring prong with helically coiled leg springs is disposed at the end of approximately radially aligned prong holders, the coil axis of the leg spring being approximately parallel to the center line of the leg spring disposed approximately tangentially to its turning circle and the two prong ends of which are aligned approximately radially and offset in height. The mode of action of such double spring prongs is not satisfactory.

SUMMARY OF THE INVENTION

It is an object of the invention to provide a hay making machine with enhanced efficiency and quality of work which is obtained by simple means.

The inventive hay making machine is suitable in an outstanding manner to increase the output and improve the quality of the work with simple means. For this purpose, pursuant to the invention, in each case several double spring prongs are disposed at the ends of the prong carrier and are constructed as leg springs, which are bent at right angles close to their coiled section. Each leg spring assumes a leading or trailing position with respect to the second leg spring. Due to this two-row arrangement of the effective ends of the leg springs, the driving speed of the tractor can be increased, while the quality of the work remains the same. Furthermore, it is possible, particularly in the case of short blades, for the second row of prongs to pick up hay left behind by the first row. The advantages also apply to relatively wet or rained-on material, which has little volume and therefore lies flat on the ground.

Pursuant to the invention, the effective ends of the individual leg springs can be disposed in various ways relative to one another, depending on which type of blade is to be worked on preferentially.

For working with hay and straw, it is advantageous if the two effective ends of the leg springs of a double spring prong work one behind the other in a working line about the axis of rotation. For this purpose, a leg spring is bent at right angles to such an extent, that the effective part works at a distance from the preceding leg spring. Alternatively, it may also be advantageous if the two leg springs are bent at right angles towards one another.

Preferably, the leg spring, which is the leading one in the direction of rotation, is disposed radially externally. This holds good also for the leading leg springs of additional double spring prongs disposed next to one another on each prong carrier.

With its second leg spring, which is disposed approximately parallel, a radially internally disposed leading leg spring has a particularly strong outward transporting effect for the blade material. Pursuant to the invention, the leading leg spring preferably is directed tangentially from the coil to the ground, while the trailing leg spring is directed approximately parallel to the ground and, in the direction of rotation, has a larger distance, so that the space between the two leg springs is sufficiently large, for example, for long material and so that the stowage spaces do not interfere with one another.

In the case of material with short blades, it may be advantageous if the parts of the leg springs of a double spring prong, which are effective for processing the blade material, pass through different working lines about the gyro axis. The raking work is particularly narrow here, so that, for example, the formation of a veil of short-bladed material, which remains lying on the ground, is effectively prevented.

Pursuant to the invention, it is possible in an advantageous manner to provide, within the double spring prongs disposed on each prong carrier, a staggering in the longitudinal distance, for which, for example, a double spring prong with a large distance between the leg springs is alternated with a double spring prong with only half the distance between the leg springs. This produces particularly intensive raking work, since the blade material is taken hold of and transported in different levels of the trailing leg springs. The blade material is gently released in the windrow by the controlled prong carrier. With this type of arrangement of the effective ends of the leg springs, the two leg springs of a double spring prong can work in one working line as well as in two working lines offset to one another.

The greater the number of double spring prongs, which are disposed on a prong carrier, the more intensive, in principle, is the raking work. Pursuant to the invention, the common vertical plane through the ends of the leading leg springs, as seen in the direction of rotation, should extend at a distance in front of the vertical gyro axis of the gyro rake. By these means, the conveying direction of the material towards the outside is favored. A common vertical plane through the ends of the trailing leg springs of the last row should intersect the vertical gyro axis of the gyro rake, in order to prevent an inwardly directly component for the conveying of the material to be processed.

Pursuant to the invention, it is also possible in an advantageous manner for the distance of the leading leg spring ends from the ground to be greater than the distance of the trailing leg spring ends. By these means, it is achieved that the leading leg springs take hold of the bulk of the blade material, while the trailing effective leg spring ends tend to rake the short blade material together.

The crank region of the leg springs preferably is disposed in the upper third region of the springs, so that the latter have no lateral cranking in their effective part. It is advantageous for the mode of operation of the double spring prong if the rear leg spring in the upper region makes an angle $\alpha$ of about 35° with the horizontal.

It may also be advantageous if a double spring prong consists of two individual leg springs, which are not permanently connected with one another and which are detachably connected individually or together with the prong carrier. In this way, the angle of incidence of the individual leg springs, for example, can be changed in a very simple manner, if it is not to be parallel.

An angular adjustment of the coherent double spring prongs with respect to the vertical plane may also be of advantage.

Pursuant to the invention, double spring prongs with two leg springs, which are disposed so as to lead or trail one another, can also advantageously be used on hay making machines for tedding with prong carriers, which are not controlled. The shape of the double spring prongs is then adapted to the circumstances. The simple doubling of the effective prongs also increases the output here and improves the quality of the work.

Further distinguishing features and advantages of the invention arise out of the following description and the drawings, in which several examples of double spring prongs for inventive hay making machines, especially gyro windrow harvesters, are shown diagrammatically.

DESCRIPTION OF THE PREFERRED EMBODIMENTS

As inventive hay making machine, a single gyro windrow harvester with several controlled prong carriers 10 is shown (FIGS. 1 and 2), which are disposed on a gyro rake 6 and, during the work, move in the direction of rotation 8 about the gyro axis 11. Details, which are of no importance to the invention, are not shown. The gyro rake 6 is connected with a machine frame 4. The machine frame 4 with the gyro rake 6 can be swiveled about a vertical axis 5 into the working position. A tractor-mounted frame 3 connects the gyro windrow harvester with a linkage 2 to the tractor 1. The gyro windrow harvester is driven by the tractor 1 over propeller shafts, which are not shown. It is supported over wheels 9, the height of which can be adjusted, on the ground. The working height of the double spring prongs 12, 13, 14, 15, 16 is also adjusted by adjusting these wheels.

Figure 1:
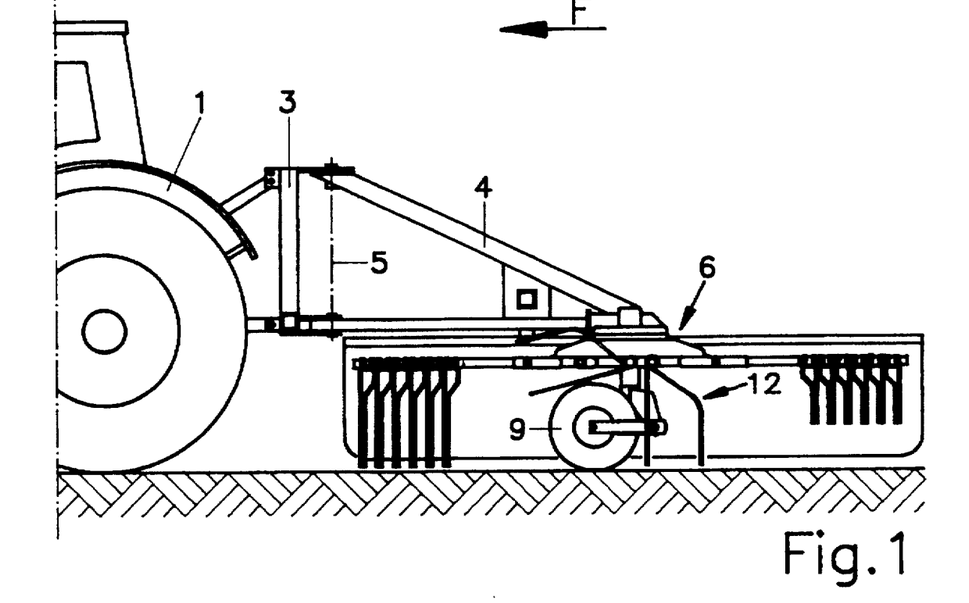
FIG. 1 shows a single gyro windrow harvester in the working position in a side view.
Figure 2:
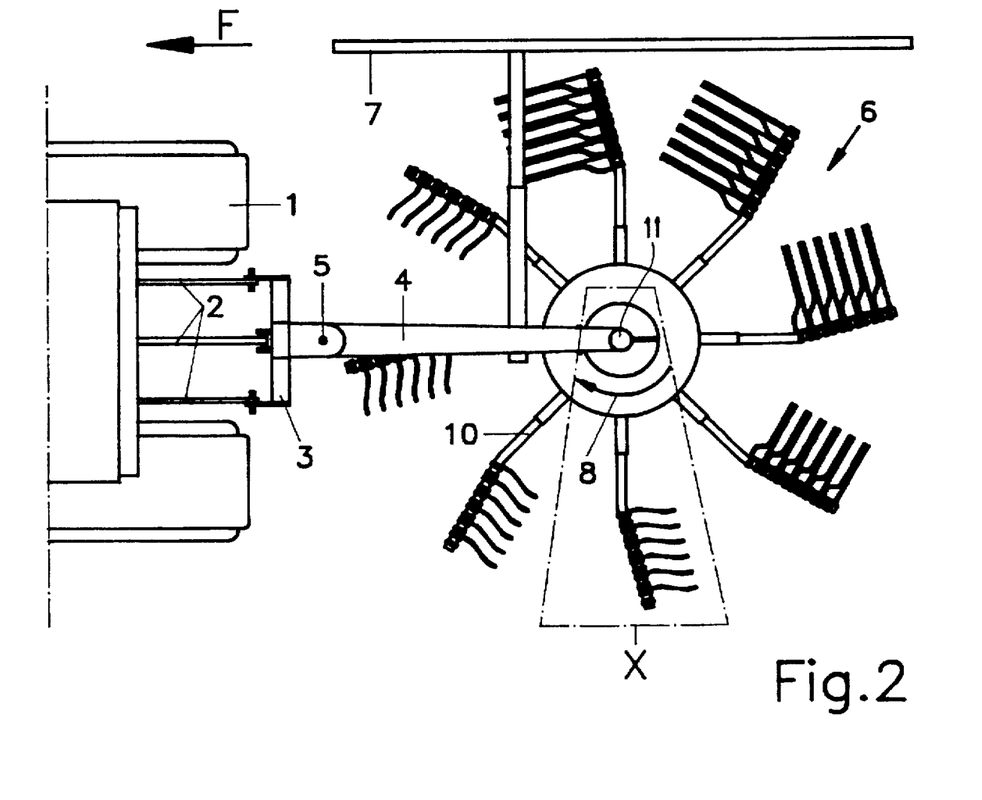
FIG. 2 shows the gyro windrow harvester of FIG. 1 in plan view.

The windrow material is conveyed in the direction of rotation 8 by the double spring prongs 12, 13, 14, 15, 16 to the controlled prong carrier 10. In the working position, the double spring prongs 12, 13, 14, 15, 16 rake the windrow material together on the left side (in the driving direction F) and form a windrow on the right side (in the driving direction F). At the same time, the double spring prongs 12, 13, 14, 15, 16 are controlled at the prong carrier 10, so that they disengage.

In the case of windrows, the invention is not limited to the single gyro windrow harvester shown as example. Multi-gyro windrow harvesters for side or central windrows could also utilize the advantages of the invention.

Figures 3, 4, 5:
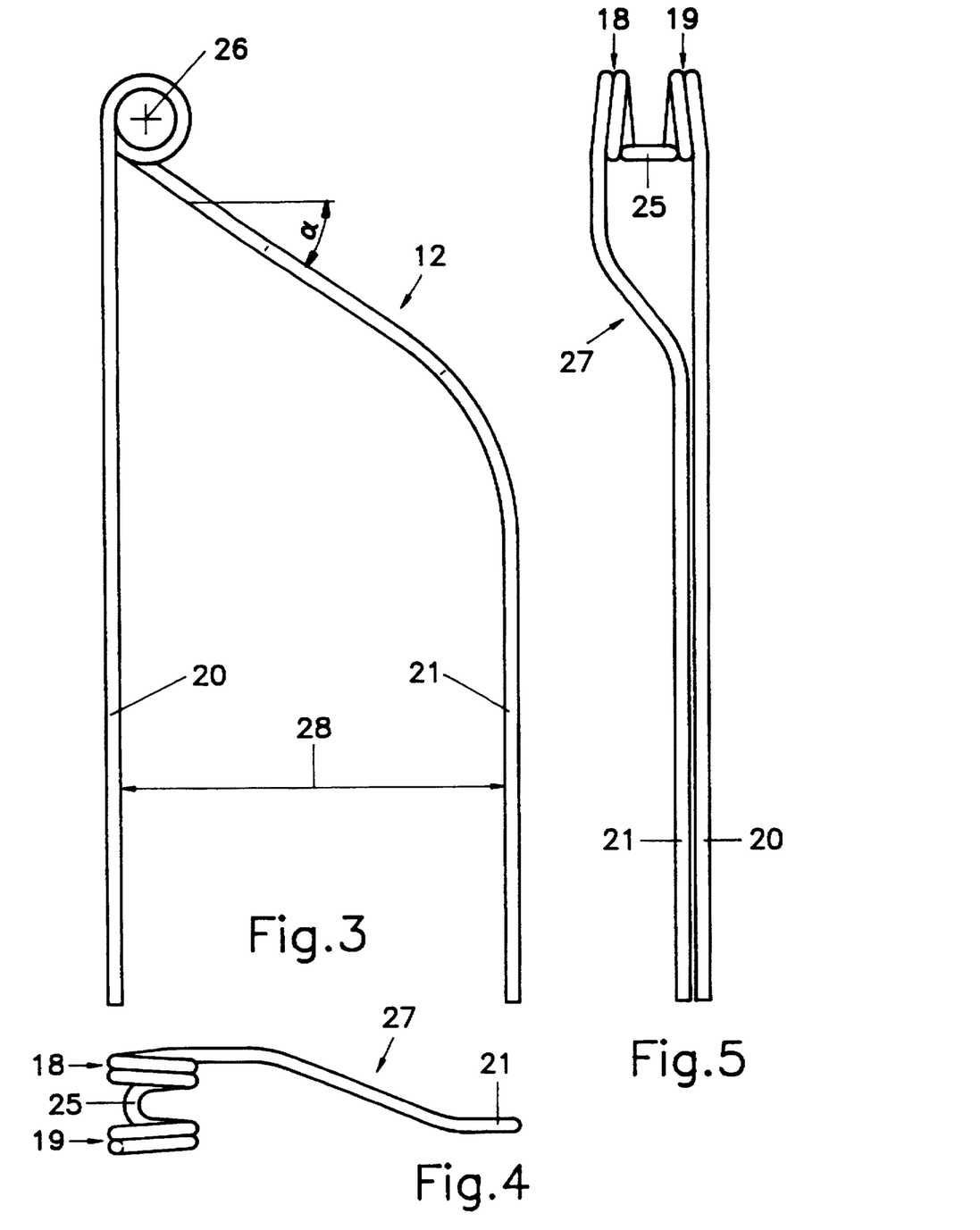
FIG. 3 shows a double spring prong in a side view.
FIG. 4 shows a plan view of the double spring prong of FIG. 3.
FIG. 5 shows a view counter to the direction of rotation of the double spring prong of FIG. 3.

FIG. 3 shows an example of a double spring prong in a side view. It consists essentially of two leg springs 20, 21, which end in the coils 18, 19 responsible for the spring behavior. The number of coils 18, 19 depends on the required spring behavior of the leg springs 20, 21. The coils 18, 19, which are coiled in opposite directions, are connected together by a U-shaped loop 25, which at the same time is used for the detachable fastening of the prong to the prong carrier 10. In the upper region, the leg springs 21, 23 extend preferably at an angle α of 35° to the horizontal.

The double spring prong 12 preferably consists of a high grade, coated, round spring steel. The leading leg spring 20 is disposed radially externally and directed tangentially from the coil 19 to the ground. The trailing leg spring 21 is directed with its effective part approximately parallel to the leading leg spring 20 and, in the direction of rotation 8, at a great distance 28 of 20 to 30 cm and preferably of 25 cm behind the leading leg spring 20. Close to its coil 18, the trailing leg spring 21 is crank-shaped in the upper third region.

In the example, the coil axis 26 is disposed approximately parallel to the longitudinal axis of the tubular prong carrier 10. Pursuant to the invention, however, other geometric shapes of prong carriers can also be used.

FIG. 4 represents a double spring prong 12 in plan view. FIG. 5 shows the double spring prong 12 in a view counter to the direction of rotation 8.

Figure 6:
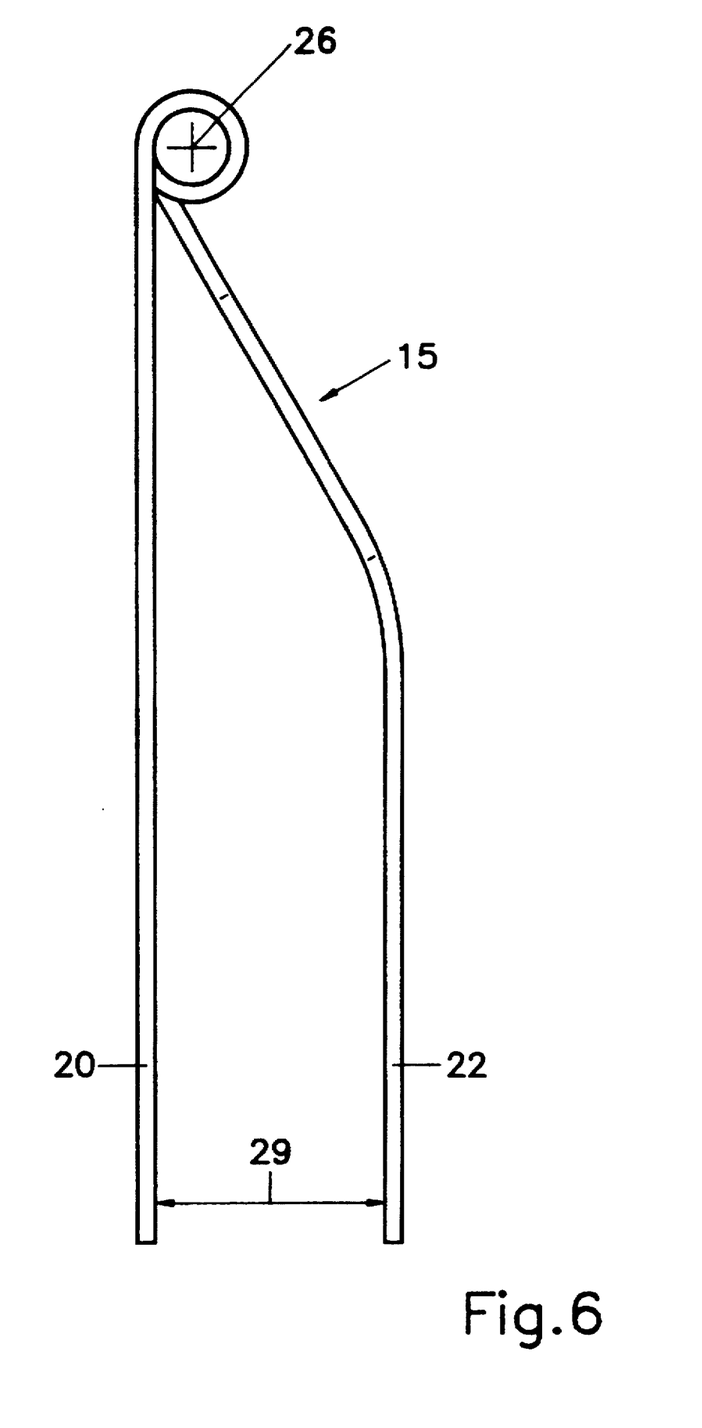
FIG. 6 shows a further example of a double spring prong in a side view.

FIG. 6 shows a further example of a double spring prong 15, which differs from the double spring coil 12 owing to the fact that the active parts of the leg springs 20, 22 are at a lesser distance 29 from one another of about 8 cm to 18 cm in the direction of rotation 8.

Figure 7:
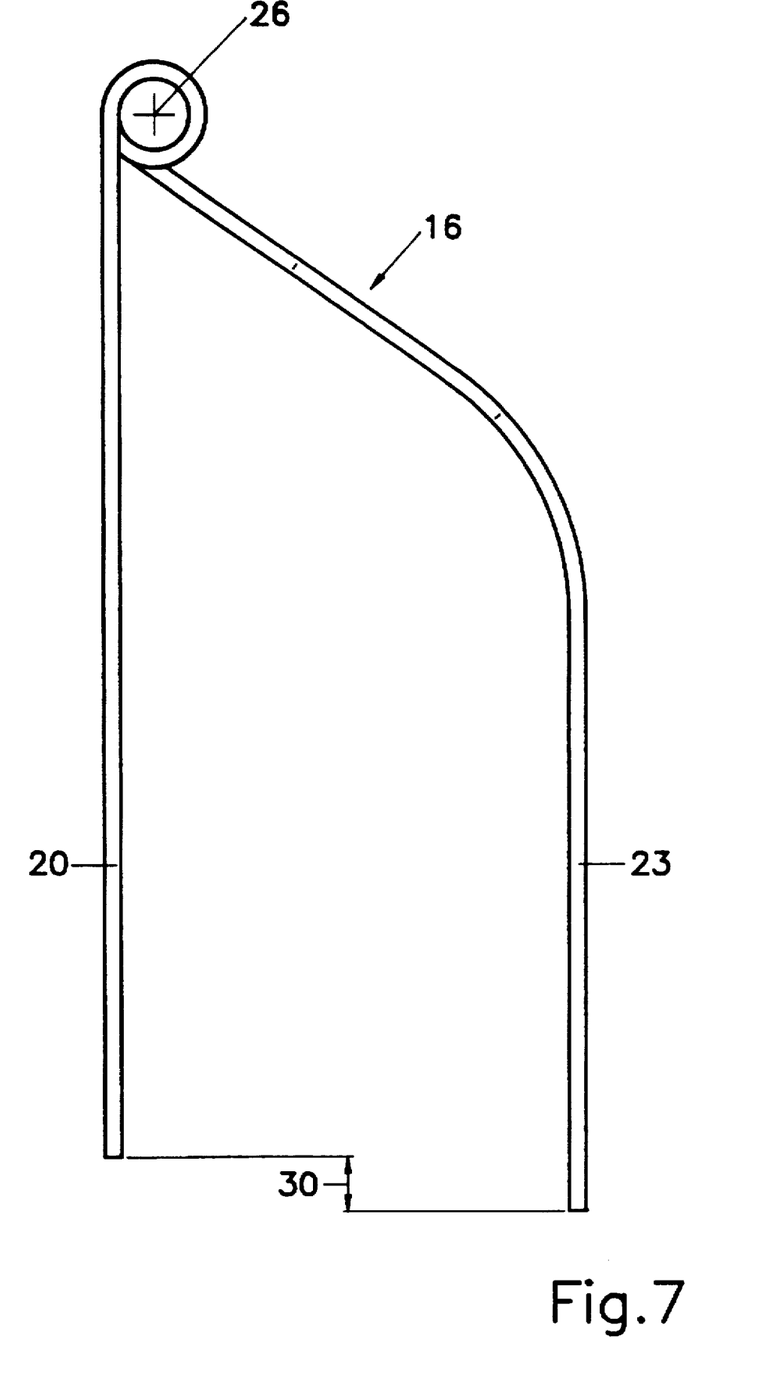
FIG. 7 shows a further example of a double spring prong in a side view.

For the double spring prong 16 of FIG. 7, the ends of the leg springs 20, 23 are not in one plane. The end of leg spring 23 is longer by the height 30. Pursuant to the invention, a different height 30 can also bring advantages in the case of double spring prongs 15.

Figure 8:
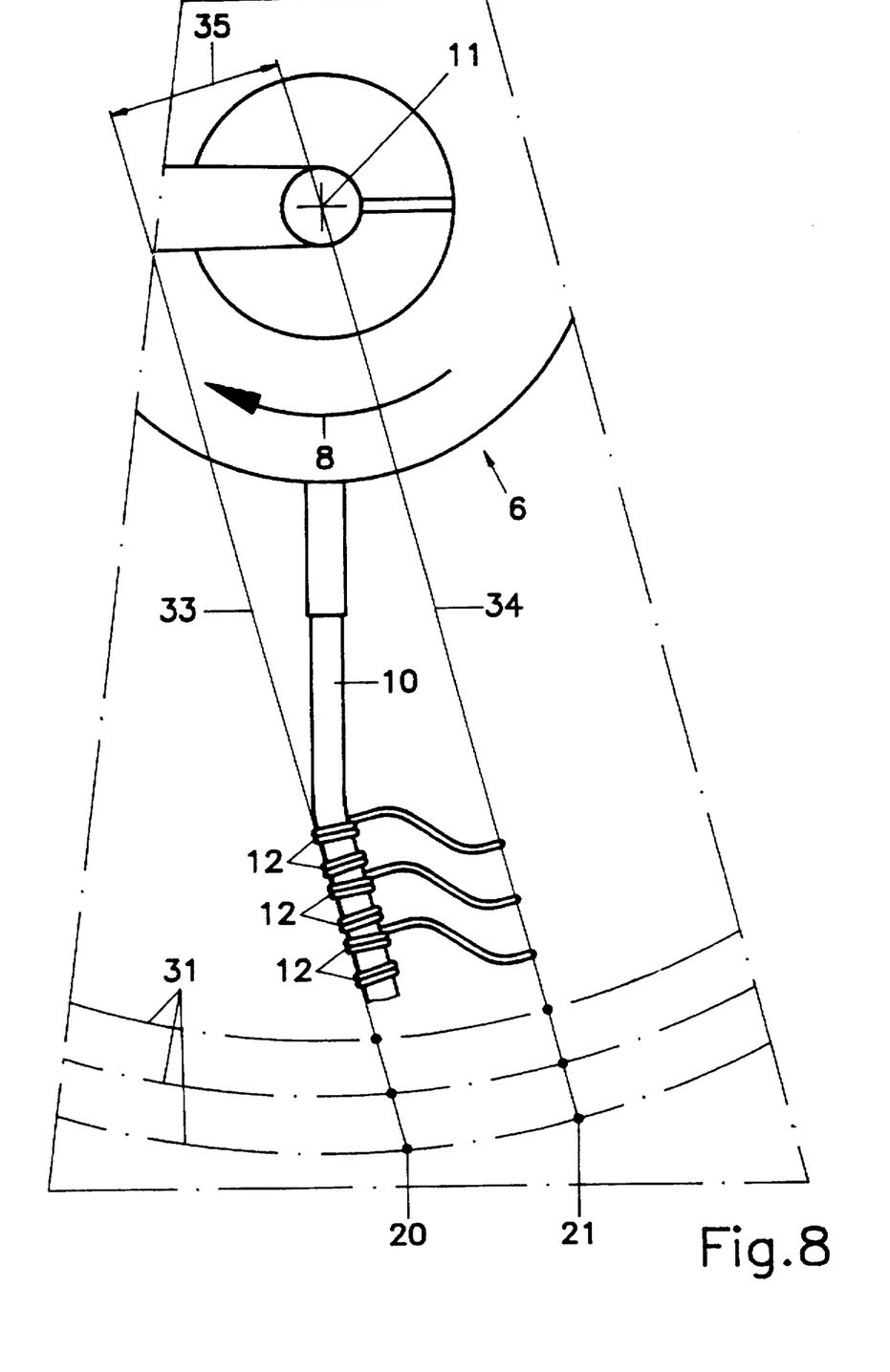
FIG. 8 shows a detail X of FIG. 2 with an example of the arrangement of the double spring prongs.

The leading and trailing leg springs 20, 21, 22, 23 can operate in the direction of rotation 8 on the same working lines 31 or on different working lines 32. FIG. 8 shows detail X of FIG. 2 on an enlarged scale. At the outer end of the prong carrier 10, six double leg prongs 12 are fastened detachably next to one another. Three inner double leg prongs 12 are shown completely in a plan view, while only the ends of the leg springs 20, 21 of the outer three double spring prongs 12 can be seen on their working lines 31. They work here in each case in one working line 31. The common vertical plane 33 through the ends of the leading leg springs 20 are disposed at a distance 35 in front of the vertical gyro axis 11 in the direction of rotation 8, while the common vertical plane 34 passes through the ends of the trailing leg springs 21 preferably through the vertical gyro axis 11.

Figure 9:
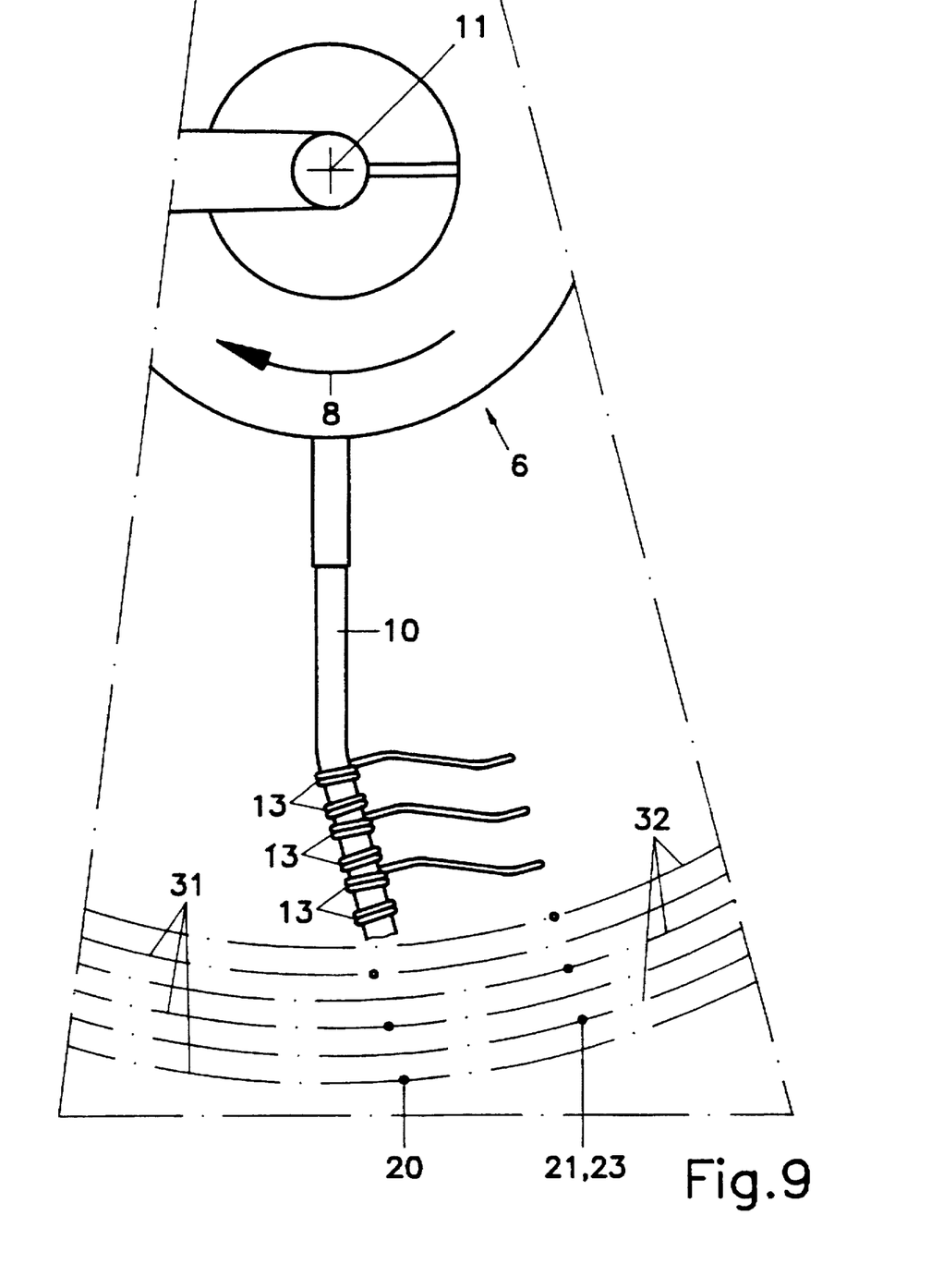
FIG. 9 shows a detail X of FIG. 2 with a further example of the arrangement of the double spring prongs.

FIG. 9 shows, in principle, also the detail X of FIG. 2. Contrary to the example of FIG. 8, the trailing ends of the leg springs 21 in each case work on their own working line 32. This is brought about by an appropriate cranking 27. The distance 28 is retained. This arrangement can be used for the double spring prong 13 and the double spring prong 16, so that the leading leg springs 20 and the trailing leg spring ends 21, 23 are shown.

Figure 10:
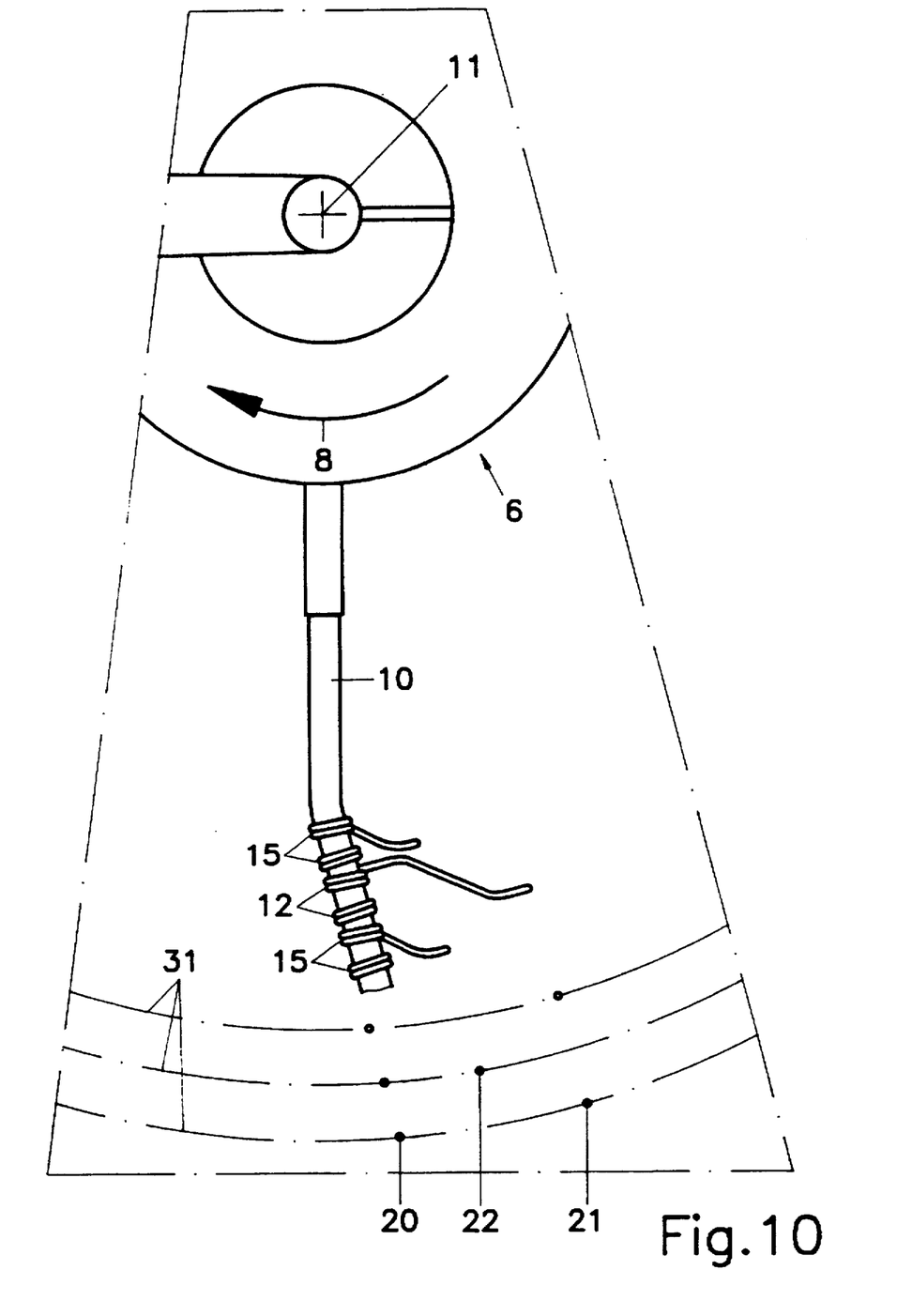
FIG. 10 shows a detail X of FIG. 2 with a further example of the arrangement of the double spring prongs.

FIG. 10 shows detail X of FIG. 2 with a further example for the arrangement of the double spring prongs 12, 15. The double spring prongs 12 and the double spring prongs 15 are disposed alternately here on the prong carrier 10. The effective ends of the leg springs 20, 21; 20, 22 work in each case one behind the other on the working lines 31.

Figure 11:
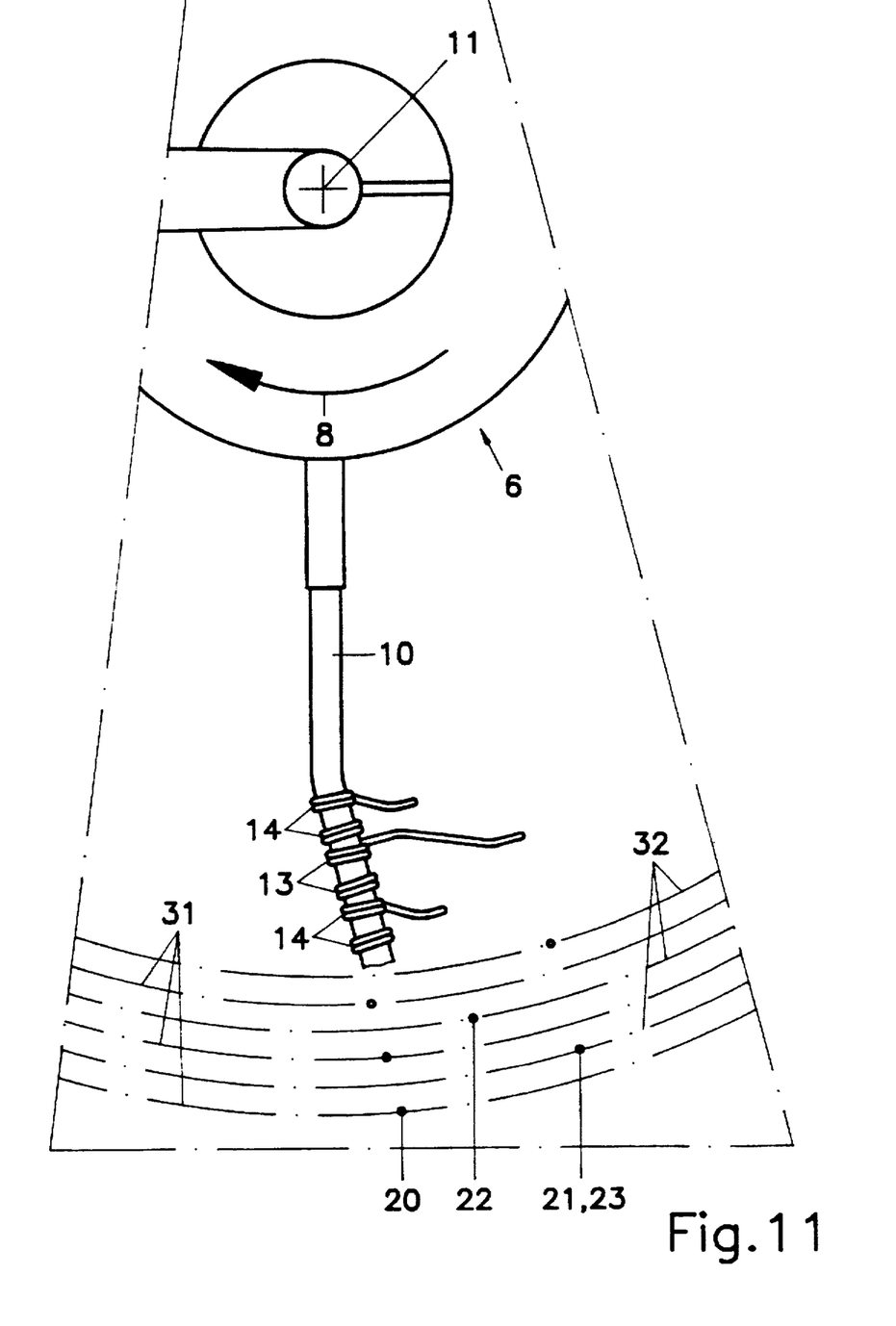
FIG. 11 shows a detail X of FIG. 2 with a further example of the arrangement of the double spring prongs.

FIG. 11 represents the detail X of FIG. 2 with a further example of the arrangement of double spring prongs 13, 14. Alternatively, double spring prongs 13 and double spring prongs 14 are disposed next to one another and connected with the prong carrier 10. The cranking 27 of each double spring prong 13, 14 is designed so that, in each case, the trailing leg spring 21, 22, 23 works on its own working line 32, while the leading leg springs 20 work on the working lines 31 about the gyro axis 11.

Pursuant to the invention, further arrangements and shapes of double spring prongs and leg springs are possible, for example, with crank-shaped leading leg springs 20.

Moreover, the double spring prongs 12, 13, 14, 15, 16 may consist of two individual leg springs, which are not connected permanently with one another and in each case are connected detachably with the prong carrier 10. At the same time, the angle between the individual leg springs about the coil axis 26 can be adjusted.

Pursuant to the invention, the angle of the double spring prongs 12, 13, 14, 15, 16 about the coil axis 26 can also be adjusted.

What I claim is:

1. A hay making machine comprising rake means supported on the ground, said rake means including a prong carrier rotatable about a rotatable axis in a rotary direction, said prong carrier having a longitudinal axis, double prong means carried on said prong carrier, said double prong means comprising first and second leg springs and a connecting section connecting said first and second leg springs, said connecting section including two helical coils coiled in opposite directions and a U-shaped loop between said two helical coils, said helical coils having an axis aligned with the longitudinal axis of said prong carrier, at least one of said first and second leg springs being displaced from underlying said helical coils, said first and second leg springs being spaced from one another in the direction of rotary movement of the prong carrier about said rotatable axis, the space between said first and second leg springs providing a storage area for accumulating and transporting raked material.

2. A hay making machine according to claim 1 wherein said first leg spring has a downward depending lower portion, said at least one of said first and second leg springs being said second leg spring, said second leg spring having a downward depending lower section displaced from underlying said helical coils and spaced from said downward depending lower portion of said first leg spring.

3. A hay making machine according to claim 2 wherein said second spring leg has a bend in a plane perpendicular to the longitudinal axis of said prong carrier.

4. A hay making machine according to claim 2 wherein said second spring leg has a bend in a plane which is parallel to the longitudinal axis of said prong carrier.

5. A hay making machine according to claim 2 further comprising rotary means for rotating said prong carrier in said rotary direction about said rotary axis, said first leg spring leading said second leg spring in said rotary direction of said prong carrier, said leading first leg spring being radially closer to said rotary axis of said prong carrier than said second leg spring.

6. A hay making machine according to claim 5 wherein said leading first leg spring extends generally tangentially from one of said helical coils towards the ground.

7. A hay making machine according to claim 2 wherein a lower end of said downward depending lower portion of said first leg spring traverses a first circular path of travel around said rotary axis of said prong carrier, a lower end of said downward depending lower section of said second leg spring traversing a second circular path of travel which is the same as the first circular path of travel around said rotary axis of said prong carrier.

8. A hay making machine according to claim 2 wherein a lower end of said downward depending lower section of said first leg spring traverses a circular path of travel around said rotary axis of said prong carrier, a lower end of said downward depending lower section of said second leg spring traversing a different circular path.

9. A hay making machine according to claim 2 wherein said downward depending lower portion of said first leg spring is substantially parallel to said downward depending lower section of said second leg section.

10. A hay making machine according to claim 9 wherein said lower portion of said first leg spring is spaced from said lower section of said second leg spring about 20 cm to 30 cm in said rotary direction of said prong carrier.

11. A hay making machine according t claim 10 wherein said lower portion of said first leg spring is spaced from said lower section of said second leg spring about 25 cm in said rotary direction of said prong carrier.

12. A hay making machine according to claim 2 wherein said prong means is designated a first prong means, and further comprising a second prong means on said prong carrier juxtaposed to said first prong means, said second prong means being substantially the same as said first prong means.

13. A hay making machine according to claim 2 further comprising a prong device on said prong carrier juxtaposed to said prong means, said prong device being different from said prong means.

14. A hay making machine according to claim 2 wherein the downward depending portion of said first leg spring has a lower end which is disposed closer to the ground than a lower end of the downward depending section of said second leg spring.

15. A hay making machine according to claim 2 wherein said second spring leg has a longitudinal length extending from an upper end which is joined to said helical coils and a lower terminating end overlying the ground, and a crank-shaped section extending over about the upper one-third of said longitudinal length of said second leg spring.

16. A hay making machine according to claim 2 wherein said said second leg spring has an upper end portion extending from said helical coil at an angle of about 20 degrees to 40 degrees relative to horizontal.

17. A hay making machine according to claim 16 wherein said angle is about 35 degrees.

18. A hay making machine according to claim 2 wherein the angle between said first and second leg springs about the axis of said coils is adjustable.

19. A hay making machine according to claim 2 wherein said first leading leg spring extends substantially vertically downwardly from said helical coils.

20. A hay making machine according to claim 2 wherein said lower portion and said lower section of said first and second leg springs respectively extend substantially vertically and parallel to one another.

21. A hay making machine comprising rake means supported on the ground, said rake means including a prong carrier rotatable about a rotatable axis in a rotary direction, said prong carrier having a longitudinal axis, double prong means carried on said prong carrier, said double prong means comprising first and second leg springs and a connecting section connecting said first and second leg springs, said connecting section including two helical coils coiled in opposite directions and a U-shaped loop between said two helical coils, said helical coils having an axis aligned with the longitudinal axis of said prong carrier, said first leg spring having a downward depending lower portion, said second leg spring having a downward depending lower section displaced from underlying said helical coils and spaced from said downward depending lower portion of said first leg spring in the direction of rotary movement of the prong carrier about said rotatable axis, the space between said downward depending lower portion and said downward depending lower section providing a storage area for accumulating and transporting raked material.

22. A hay making machine according to claim 2 wherein said helical coil springs encircle said prong carrier, said encircling helical coil springs biasingly gripping said prong carrier to detachably fasten said double prong means to said prong carrier.

23. A hay making machine according to claim 2 wherein said first and second leg springs, said two helical coils and said U-shaped loop are all one continuous and integral structural member.

24. A hay making machine comprising rake means supported on the ground, said rake means including a prong carrier having a longitudinal axis, rotary means rotating said prong axis about a rotary axis in a rotary direction, a first double prong means carried on said prong carrier, said first double prong means comprising first and second leg springs and a first pair of helical coils mounting said first and second leg springs on said prong carrier, said first pair of helical coils being coiled in opposite directions, said first pair of helical coils having an axis aligned with the longitudinal axis of said prong carrier, said first leg spring having a downward depending lower portion, second leg spring having a downward depending lower section displaced from underlying said first pair of helical coils and spaced from said downward depending lower portion of said first leg spring in the direction of rotary movement of the prong carrier about said rotatable axis, the space between said downward depending lower portion and said downward depending lower section providing a storage area for accumulating and transporting raked material a second double prong means carried on said prong carrier, said second double prong means comprising third and fourth leg springs and a second pair of helical coils mounting said third and fourth leg springs on said prong carrier, said second pair of helical coils being coiled in opposite directions, said second pair of helical coils having an axis aligned with the longitudinal axis of said prong carrier, said third leg spring having a downward depending lower part, said fourth leg spring having a downward depending lower segment displaced from underlying said second pair of helical coils and spaced from said downward depending lower part of said third leg spring in the direction of rotary movement of the prong carrier about said rotatable axis, the space between said downward depending lower part and said downward depending lower segment providing a storage area for accumulating and transporting raked material.

25. A hay making machine according to claim 24 wherein said downward depending lower portion of said first leg spring leads said downward depending lower section of said second leg spring by a first distance, said downward depending lower part of said third leg spring leading said downward depending lower segment of said fourth leg spring by a second distance, said first distance being substantially equal to said second distance.

26. A hay making machine according to claim 24 wherein said downward depending lower portion of said first leg spring leads said downward depending lower section of said second leg spring by a first distance, said downward depending lower part of said third leg spring leading said downward depending lower segment of said fourth leg spring by a second distance, said first distance being different from said second distance.

27. A hay making machine according to claim 24 wherein said downward depending lower portion and said downward depending lower part are disposed in a plane parallel to and spaced from said rotary axis of said prong carrier.

28. A hay making machine according to claim 27 wherein the plane in which said downward depending lower portion and said downward depending lower part is spaced ahead of said rotary axis of said prong carrier in the rotary direction of said prong carrier.

29. A hay making machine according to claim 27 wherein said downward depending lower section and said downward depending lower segment each have a terminating end piece disposed in a plane which is parallel to and which contains said rotary axis of said prong carrier.

30. A hay making machine comprising rake means supported on the ground, said rake means including a prong carrier having a longitudinal axis, rotary means rotating said prong axis about a rotary axis in a rotary direction, double prong means carried on said prong carrier, said double prong means comprising first and second leg springs on said prong carrier, said pair of helical coils being coiled in opposite directions, said second leg spring trailing said first leg spring in a rotary direction as said rake means rotates about said rotary axis, said second leg spring having an upper section and a lower section, said upper section having a configuration which increases the space between said lower section and said first leg spring in a circumferential direction with respect to said rotary axis and to dispose said lower section in a position displaced from underlying said pair of helical coils, said space between said first leg spring and said lower section of said second leg spring providing a storage area for accommodating and transporting raked material.

31. A hay making machine according to claim 30 wherein said pair of helical coils are connected to one another.

32. A hay making machine according to claim 30 wherein said pair of helical coils are connected to one another by an integral U-shaped section.

33. A hay making machine according to claim 30 wherein said pair of helical coils are separate and unconnected to each other.

* * * * *